US 6,709,760 B2

(12) United States Patent
Trumbore et al.

(10) Patent No.: US 6,709,760 B2
(45) Date of Patent: Mar. 23, 2004

(54) CROSSLINKED MODIFIED SHINGLE ADHESIVE

(75) Inventors: David C. Trumbore, La Grange, IL (US); Jay W. Keating, Tinley Park, IL (US); David R. Jones, Tampa, FL (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 135 days.

(21) Appl. No.: 10/063,248

(22) Filed: Apr. 3, 2002

(65) Prior Publication Data

US 2002/0142180 A1 Oct. 3, 2002

Related U.S. Application Data

(62) Division of application No. 09/677,572, filed on Sep. 29, 2000, now abandoned.

(51) Int. Cl.$^7$ .............................. C08L 95/00
(52) U.S. Cl. ................. 428/489; 428/147; 428/355 BL
(58) Field of Search .................. 428/147, 355 BL, 428/489

(56) References Cited

U.S. PATENT DOCUMENTS 4,595,636 A * 6/1986 Wiercinski et al. ......... 428/489
5,253,461 A * 10/1993 Janoski et al. ................ 52/408

* cited by examiner

*Primary Examiner*—Peter Szekely
(74) *Attorney, Agent, or Firm*—Inger H. Eckert; James J. Dottavio

(57) ABSTRACT

An adhesive for a roof covering comprises asphalt, polymer and crosslinker. The crosslinker is a phenolic resin or a phenol-aldehyde resin. In another embodiment, the adhesive comprises asphalt, polymer and crosslinker, and it excludes polyfunctional amine having at least two amino groups.

20 Claims, No Drawings

CROSSLINKED MODIFIED SHINGLE ADHESIVE

CROSS REFERENCE TO RELATED APPLICATIONS

This application is a divisional of U.S. patent application Ser. No. 09/677,572 filed Sep. 29, 2000 now abandoned.

BACKGROUND OF INVENTION

It is known to use adhesives to provide a bond between shingles on a roof. Some shingle adhesives are made with blends of asphalt and polymer. During a typical shingle manufacturing process, a pattern of adhesive is applied to the headlap portion of the shingles, so that the tab portion of the subsequently laid course of shingles on the roof will adhere to the headlap portion of the lower course. The adhesive bond helps to prevent wind uplift of the shingles on the roof. It is also known to use adhesives to provide a bond between overlay and underlay portions of a laminated shingle.

U.S. Pat. No. 5,278,207 to Kluttz discloses a composition which may be used as an adhesive on a roofing material. The composition includes asphalt, a polyfunctional amine having at least two amino groups, a polymer such as SBS elastomer, and a crosslinker such as sulfur. The polyfunctional amine is said to be critical to prevent separation of the polymer from the asphalt. There is no suggestion to use a phenolic resin or a phenol-aldehyde resin as a crosslinker in a shingle adhesive.

U.S. Pat. No. 5,256,710 to Krivohlavek discloses a composition including an asphalt, a polymer, and a crosslinker which is either a phenolic resin or a phenol-aldehyde resin. There is no suggestion to use the composition as a shingle adhesive or other type of adhesive.

U.S. Pat. No. 5,270,361 to Duong et al. discloses a composition made from asphalt, natural or synthetic rubber, and selenium as a crosslinker. The patent states that the composition can be used for paving or shingles, but there is no suggestion to use the composition as a shingle adhesive or other type of adhesive.

It would be desirable to provide an improved shingle adhesive having consistency of performance, heat stability, ability to be handled in bulk, flexibility in the choice of asphalt used, and resistance to flattening under the pressure exerted by stacked shingles.

SUMMARY OF INVENTION

The above objects as well as others not specifically enumerated are achieved by an improved adhesive for a roof covering in accordance with the present invention. The adhesive comprises asphalt, polymer and crosslinker. In a first embodiment of the invention, the crosslinker is a phenolic resin or a phenol-aldehyde resin.

In a second embodiment, the adhesive comprises asphalt, polymer and crosslinker, and it excludes polyfunctional amine having at least two amino groups.

Various objects and advantages of this invention will become apparent to those skilled in the art from the following detailed description of the preferred embodiments, when read in light of the accompanying drawings.

DETAILED DESCRIPTION

The present invention uses crosslinking technology to create a modified asphalt adhesive having desirable properties for use on roof coverings such as shingles. In particular, the adhesive has excellent compatibility between the asphalt and the polymer, and excellent thermal stability at elevated temperatures. These attributes improve the consistency of performance of the adhesive, allow for bulk transport of the adhesive, and increase the number of asphalts that are usable in the adhesive. The adhesive also has the ability to maintain its shape under the high pressure exerted by stacked shingles. The adhesive retains good bond strength at low temperatures, so that it meets the needs of shingles in cold climates.

The adhesive includes an asphalt, a polymer and a crosslinker. It has been found that an adhesive having the desired properties can be achieved by the choice of a suitable crosslinker and polymer. This contrasts with the above-mentioned Kluttz patent, which states that a particular polyfunctional amine is critical to prevent separation of the polymer from the asphalt. The adhesive of the present invention has excellent compatibility so that it is highly resistant to separation even without the addition of a polyfunctional amine.

The asphalt for use in the adhesive can be either a naturally occurring asphalt or a manufactured asphalt, such as an asphalt produced by refining petroleum or by other known means. Mixtures of different asphalts can also be used. Advantageously, the improved compatibility between the asphalt and the polymer allows increased flexibility in the type of asphalt used in the adhesive. Preferably, the asphalt is a paving grade asphalt or a roofing flux, or a blend of one of these with a solvent extracted asphalt such as a propane deasphalted asphalt ("PDA"). In a particular embodiment, the asphalt is a blend of paving grade asphalt and PDA.

The polymer for use in the adhesive can be any polymer suitable for combining with the asphalt and crosslinker to provide an adhesive having the desired properties. Mixtures of different polymers can also be used. Preferably, the polymer has double bonds which provide bonding sites for the crosslinker. Also preferably, the polymer is a thermoplastic elastomer such as a block copolymer, usually triblock (A—B—A), and either linear or radial in structure. Either block, A or B, may comprise more than one monomer. Preferred are those triblock copolymers having styrene or polystyrene as the "A" block or end block units. Suitable elastomers include thermoplastic rubbers of styrene-butadiene-styrene (S—B—S) and styrene-isoprene-styrene (S—I—S) block copolymers. Suitable elastomers are commercially available from Kraton Polymers (Houston, Tex.) as KRATON™ thermoplastic rubbers, KRATON D grade. Most preferred is KRATON D-4158 (S—B—S) thermoplastic rubber, a radial block copolymer which contains paraffinic oil as an extender.

The crosslinker for use in the adhesive can be any crosslinker suitable for combining with the asphalt and polymer to provide an adhesive having the desired properties. Mixtures of different crosslinkers can also be used. Some examples of suitable crosslinkers include sulfur crosslinkers and silane coupling agents such as those available from Harwick Chemical Corp., Akron, Ohio under the trade names Harwick DSC-45 (tetrasulfide organofunctional group), DSC-25 (mercapto) and DSC-30 (polysulfide). A highly preferred crosslinker for use in the adhesive is a phenolic resin or a phenol-aldehyde resin, such as disclosed in U.S. Pat. No. 5,256,710 to Krivohlavek, issued Oct. 26, 1993 (incorporated by reference herein). A crosslinker as described in the Krivohlavek patent is commercially available as BUTAPHALT™ from TexPar Energy, Sandy, Utah. BUTAPHALT was registered in 1997 to Asphalt Technology and Consulting, Inc., Oklahoma (Registration No. 2040669).

The adhesive can optionally include other ingredients commonly used in shingle adhesives, in concentrations taught in the art, such as fillers, stabilizers, antioxidants, pigments, and solvents.

The composition of the adhesive will often vary depending on the use of the adhesive. When the adhesive is used as a sealant for three-tab shingles, preferably the adhesive comprises, by weight, about 85% to about 95% asphalt, about 5% to about 15% polymer and about 0.05% to about 2% crosslinker. Typically, the adhesive comprises about 88% to about 94% asphalt, about 6% to about 12% polymer and about 0.05% to about 1% crosslinker. In a particular embodiment, the adhesive comprises less than 9% polymer and greater than 0.1% crosslinker. When the adhesive is used as a laminating adhesive to make laminated shingles, preferably the adhesive comprises, by weight, about 90% to about 97% asphalt, about 3% to about 10% polymer and about 0.05% to about 1% crosslinker.

An example of a preferred adhesive for use as a sealant for three-tab shingles has the following composition: 92% Asphalt (blend of paving asphalt and PDA) 8% KRATON, 4158 0.2% BUTAPHALT. Conventional mixing or blending techniques can be used to make the adhesive. Typically, the ingredients are mixed for at least about four hours. Generally, throughout the mixing, the temperature is desirably maintained from about 260° F. to about 360° F. The adhesive is either shipped and used in bulk without cooling, or cooled in packages and then melted for application to shingles or other roof covering.

The adhesive can be applied to any type of roof covering, such as three-tab shingles, laminated shingles, roll roofing, built-up roofing, or non-asphalt based roof coverings such as wooden or slate shingles. The adhesive can be applied by conventional application techniques. Different roof coverings and application techniques are well known in the art. For example, U.S. Pat. No. 4,738,884 to Algrim et al., issued Apr. 19, 1988 (incorporated by reference herein) discloses an adhesive applied to three-tab shingles. U.S. Pat. No. 6,014,847 to Phillips, issued Jan. 18, 2000 (incorporated by reference herein) discloses using a laminating adhesive to attach the underlay to the overlay of a laminated shingle.

In a typical application, the adhesive is applied in a pattern on the headlap portion of a three-tab shingle for use as a sealant. The adhesive is usually applied as a bead which protrudes a short distance from the surface of the shingle. When the shingle is installed on a roof, the tab portion of the upwardly adjacent shingle is pressed against the adhesive bead to bond the tab portion, thereby helping to prevent wind uplift of the tab portion.

In another application, the adhesive is used for laminating shingle parts together to make a three dimensional looking shingle. The compatibility, stability and strength properties of the adhesive, as discussed herein, are also of value in this application.

The adhesive has excellent compatibility between the polymer and the asphalt, so that it is highly resistant to separation of the polymer from the asphalt even after storage at elevated temperature. The resistance to separation can be tested by placing a sample of the adhesive in a cigar-shaped tube and storing the tube vertically at 350° F. for 24 hours. The tube is then cooled to room temperature, and the sample is removed from the tube. The top third of the sample and the bottom third of the sample are each tested for softening point by the conventional ring and ball method. If the softening point of the top of the sample is substantially greater than the softening point of the bottom of the sample, this indicates that a significant proportion of the polymer has separated from the asphalt and risen to the top of the tube (because the polymer is lighter than the asphalt). On the other hand, if the top and bottom softening points are not substantially different, this indicates that little separation of the polymer from the asphalt has occurred. Preferably, the adhesive has a difference in softening point of less than about 35° F. between the top and the bottom of the adhesive, and more preferably less than about 30° F. Of course the resistance to separation, like any other parameter mentioned in this application, can be measured by any other suitable test.

As discussed above, when used as a sealant, the adhesive is often applied to shingles in the shape of a bead which protrudes a short distance from the surface of the shingle. A problem that can occur during storage of shingles is that the adhesive bead becomes flattened under the high pressure exerted by the stacked shingles, reducing the ability of the bead to bond the shingles together on the roof. Advantageously, the adhesive of the invention is sufficiently firm so that it maintains its shape under the high pressure exerted by stacked shingles. Preferably, the adhesive has a Brookfield viscosity at 350° F. between about 300 centipoise and about 1000 centipoise. The viscosity needs to be low enough to allow pumping and application but high enough to maintain bead height while cooling on the sheet. Preferably, the adhesive has a penetration at 77° F. between about 25 dmm and about 40 dmm. Too soft an adhesive may be too tacky and lack resistance to flow while too hard a bead may not have the proper activation temperature. The penetration is measured by ASTM D5. Preferably, the adhesive has a softening point between about 180° F. and about 220° F. to allow proper bead height and also good activation temperature.

The bond strength of the adhesive is evaluated using ASTM D 6381 by sealing at a variety of temperatures and testing at a variety of temperatures. It is desired to have good bond strengths over a range of both sealing temperature and testing temperature. Preferably, the adhesive has a bond strength after sealing at 140° F. that is greater than 3 lbs. at 0° F. and greater than 10 lbs. at 77° F. Preferably, the adhesive even seals at 100° F., and has a bond strength after sealing at 100° F. of at least 3 lbs. at 77° F.

EXAMPLES

Blends were made up with a base asphalt consisting of Amoco Whiting 58–28 paving asphalt and one of several propane deasphalting residia. The base asphalt was then blended with 10% Shell KRATON 4158 SBS which contains 30% oil in the polymer crumb. The blends were made with and without BUTAPHALT B720 crosslinker. The results follow, with cigar tube separation being superior with the BUTAPHALT mixes in every case. The improvement was from 44° F. to 76° F. in softening point difference and one BUTAPHALT sample had only 2° F. difference top to bottom compared to 78° F. without BUTAPHALT. Another item of interest is the improved properties (higher softening point, penetration and viscosity) with the same amount of polymer and BUTAPHALT compared to no BUTAPHALT indicating that the polymer loading can be lowered. Finally, clearly the BUTAPHALT allowed more asphalt sources to be used.

| Asphalt Base | PDA in Base | Butaphalt | Kraton 4158 | SP (° F.) | Pen @ 77° F. (dmm) | Visc @ 350° F. (cps) | Separation (° F.) |
|---|---|---|---|---|---|---|---|
| 55% PG5828 | 45% PDA Sun | none | 10% | 192 | 29.5 | 537 | 87 |
| 55% PG5828 | 45% PDA Sun | 0.20% | 10% | 211 | 35.5 | 684 | 34 |
| 55% PG5828 | 45% PDA Martrex | none | 10% | 207 | 31.5 | 663 | 75 |
| 55% PG5828 | 45% PDA Martrex | 0.20% | 10% | 220 | 34.5 | 745 | 31 |
| 55% PG5828 | 45% PDA Fina | none | 10% | 208 | 31.5 | 492 | 78 |
| 55% PG5828 | 45% PDA Fina | 0.20% | 10% | 212 | 39.5 | 810 | 2 |

To show that similar results can be achieved with different asphalts, a batch of adhesive was made with a base blend of 50% Lagoven flux, 50% Fina PDA and then a blend was made with 92% asphalt base, 8% KRATON 4158 and 0.2% BUTAPHALT. Properties are indicated below.

Alternate Adhesive Formula

Softening Point 215° F.

Penetration at 77° F. 35 dmm

Viscosity at 350° F. 843 cps

Separation SP Difference 2° F.

Tests were run with formulas blended with and without BUTAPHALT in our manufacturing facility and then run in our roofing plant as a shingle adhesive on shingles. These shingles were shipped to our testing laboratory and tested for bond strength. The results follow. As can be seen we achieved superior bond strength performance and negligible separation with less polymer with BUTAPHALT.

Standard formula: 90% Base Asphalt, 10% KRATON 4158. Base asphalt 55% Amoco 58–28, 45% Sun PDA.

BUTAPHALT formula: 92% Base Asphalt, 8% KRATON 4158. Base asphalt 55% Amoco 58–28, 45% Sun PDA.

| Property | Standard Adhesive | Butaphalt Adhesive |
|---|---|---|
| Softening Point | 203° F. | 201° F. |
| Penetration at 77° F. | 29 dmm | 27 dmm |
| Viscosity at 350° F. | 612 cps | 630 cps |
| Separation difference in SP | 40° F. | 2° F. |

Shingle Bond Strength
Sealed at 100° F., tested at 75° F. 4.1, 6.1, 6.0 lbs. 7.7, 10.6 lbs.

Similarly, tests were run on Standard vs. BUTAPHALT formulas by making shingles with the different adhesives applied on a test rig on a shingle line and testing at a variety of bond temperatures and pull temperatures. Adhesives were the same as in the plant test above. The results follow and indicate that the BUTAPHALT adhesive performs better than standard in four of the six tests and marginally lower in one test.

| Test Conditions | Standard Adhesive Bond Strength (lbs.) | Butaphalt Adhesive Bond Strength (lbs.) |
|---|---|---|
| Sealed 100° F., pulled 75° F. | 4.5 | 7.2 |
| Sealed 120° F., pulled 75° F. | 16.8 | 19.2 |
| Sealed 140° F., pulled 75° F. | 24.9 | 24.9 |
| Sealed 100° F., pulled 35° F. | 1.1 | 3.2 |
| Sealed 120° F., pulled 35° F. | 7.5 | 13.8 |
| Sealed 140° F., pulled 0° F. | 23.4 | 20.0 |

Finally, a test was run in a 1000 gallon tank where adhesive with and without BUTAPHALT was kept under storage at 350° F. for several weeks, testing viscosity at 350° F. periodically to see when degradation of the adhesive occurred. Normally when degradation occurs the viscosity starts to rise more and more rapidly. The numbers below indicate that the crosslinked adhesive is superior to the standard adhesive by many days under storage.

| Standard Adhesive Storage Test Days Stored | Butaphalt Adhesive Storage Test Viscosity (cps) | Days Stored | Viscosity (cps) |
|---|---|---|---|
| 0 | 612 | 0 | 469 |
| 4 | 692 | 1 | 541 |
| 8 | 761 | 8 | 478 |
| 12 | 804 | 12 | 512 |
| 15 | 983 | 15 | 553 |
| 19 | 1252 | 19 | 650 |

As indicated above, laminating adhesive tends to have less polymer and be higher in penetration. Following is a comparison of two formulas that show the ability of BUTAPHALT to improve the compatibility of a typical laminating adhesive.

| | Standard Adhesive | Butaphalt Adhesive |
|---|---|---|
| Asphalt Base | 92.75% | 94% |
| Kraton 1184 | 5.5% | 4% |
| Shellflex 3681 Oil | 1.75% | 2% |

-continued

| | Standard Adhesive | Butaphalt Adhesive |
|---|---|---|
| Butaphalt | None | 0.2% |
| Softening Point | 209° F. | 200° F. |
| Penetration at 77° F. | 51 dmm | 61 dmm |
| Viscosity at 350° F. | 377 cps | 371 dmm |
| Separation SP difference | 92° F. | 2° F. |

The principle and mode of operation of this invention have been described in its preferred embodiments. However, it should be noted that this invention may be practiced otherwise than as specifically illustrated and described without departing from its scope. For example, while the invention has been described primarily in terms of a shingle adhesive, it should be recognized that the invention is applicable to adhesives for any type of roof covering. While the invention has been exemplified in terms of specific compositions of asphalt, polymer and crosslinker, it should be recognized that other compositions containing other types of asphalt, polymer and crosslinker are also within the scope of the invention.

What is claimed is:

1. A roof covering assembly comprising a first roof covering, a second roof covering, and an adhesive between the first and second roof coverings bonding the roof coverings together, the adhesive comprising asphalt, polymer, and crosslinker comprising phenolic resin or phenol-aldehyde resin.

2. A roof covering assembly according to claim 1 wherein the roof coverings are roofing shingles, and wherein the adhesive comprises, by weight, about 85% to about 95% asphalt, about 5% to about 15% polymer and about 0.05% to about 2% crosslinker.

3. A roof covering assembly according to claim 1 wherein the polymer has double bonds which provide bonding sites for the crosslinker.

4. A roof covering assembly according to claim 1 wherein the adhesive has a difference in softening point of less than about 35° F. between the top and the bottom of the adhesive, after storage at 350° F. for 24 hours.

5. A roof covering assembly according to claim 1 wherein the roof coverings are roofing shingles, wherein the adhesive is in the shape of a bead, and wherein the adhesive has a Brookfield viscosity at 350° F. between about 300 centipoise and about 1000 centipoise.

6. A roof covering assembly according to claim 1 wherein the roof coverings are roofing shingles, wherein the adhesive is in the shape of a bead, and wherein the adhesive has a penetration at 77° F. between about 25 dmm and about 40 dmm.

7. A roof covering assembly according to claim 1 wherein the roof coverings are roofing shingles, wherein the adhesive is in the shape of a bead, and wherein the adhesive has a softening point between about 180° F. and about 220° F.

8. A roof covering assembly according to claim 1 wherein the adhesive, after bonding the roof coverings together at 140° F., has a bond strength of greater than 3 lbs. at 0° F. and greater than 10 lbs. at 77° F.

9. A roof covering assembly comprising a first roof covering, a second roof covering, and an adhesive between the first and second roof coverings bonding the roof coverings together, the adhesive comprising asphalt, polymer, and crosslinker, and the adhesive excluding polyfunctional amine having at least two amino groups.

10. A roof covering assembly according to claim 9 wherein the roof coverings are roofing shingles, and wherein the adhesive comprises, by weight, about 85% to about 95% asphalt, about 5% to about 15% polymer and about 0.05% to about 2% crosslinker.

11. A roof covering assembly according to claim 9 wherein the adhesive has a difference in softening point of less than about 35° F. between the top and the bottom of the adhesive, after storage at 350° F. for 24 hours.

12. A roof covering assembly according to claim 9 wherein the roof coverings are roofing shingles, wherein the adhesive is in the shape of a bead, and wherein the adhesive has a Brookfield viscosity at 350° F. between about 300 centipoise and about 1000 centipoise.

13. A roof covering assembly according to claim 9 wherein the roof coverings are roofing shingles, wherein the adhesive is in the shape of a bead, and wherein the adhesive has a penetration at 77° F. between about 25 dmm and about 40 dmm.

14. A roof covering assembly according to claim 9 wherein the roof coverings are roofing shingles, wherein the adhesive is in the shape of a bead, and wherein the adhesive has a softening point between about 180° F. and about 220° F.

15. A roof covering assembly according to claim 9 wherein the adhesive, after bonding the roof coverings together at 140° F., has a bond strength of greater than 3 lbs. at 0° F. and greater than 10 lbs. at 77° F.

16. A laminated roofing shingle comprising a shingle overlay, a shingle underlay, and an adhesive between the overlay and the underlay bonding them together, the adhesive comprising asphalt, polymer, and crosslinker comprising phenolic resin or phenol-aldehyde resin.

17. A laminated roofing shingle according to claim 16 wherein the adhesive comprises, by weight, about 90% to about 97% asphalt, about 3% to about 10% polymer and about 0.05% to about 1% crosslinker.

18. A laminated roofing shingle according to claim 16 wherein the adhesive, after adhering the overlay and the underlay to one another at 140° F., has a bond strength of greater than 3 lbs. at 0° F. and greater than 10 lbs. at 77° F.

19. A laminated roof shingle comprising a shingle overlay, a shingle underlay, and an adhesive between the overlay and the underlay bonding them together, the adhesive comprising asphalt, polymer, and crosslinker, and the adhesive excluding polyfunctional amine having at least two amino groups.

20. A laminated roofing shingle according to claim 19 wherein the adhesive comprises, by weight, about 90% to about 97% asphalt, about 3% to about 10% polymer and about 0.05% to about 1% crosslinker.

* * * * *

UNITED STATES PATENT AND TRADEMARK OFFICE
CERTIFICATE OF CORRECTION

PATENT NO. : 6,709,760 B2
DATED : March 23, 2004
INVENTOR(S) : Trumbore

It is certified that error appears in the above-identified patent and that said Letters Patent is hereby corrected as shown below:

<u>Title page</u>,
Item [75], Inventors, "David R. Jones" should have the suffix -- IV -- after his name.

Signed and Sealed this

Fourteenth Day of December, 2004

JON W. DUDAS
*Director of the United States Patent and Trademark Office*